(12) United States Patent
Beck et al.

(10) Patent No.: US 7,386,436 B2
(45) Date of Patent: Jun. 10, 2008

(54) VIEWING SYSTEM THAT SUPPORTS MULTIPLE ELECTRONIC DOCUMENT TYPES

(75) Inventors: James Beck, Freedom, PA (US); Kelly Dolan, Mars, PA (US); William Ross, San Francisco, CA (US); Gregory Zelesnik, Pittsburgh, PA (US)

(73) Assignee: Inmedius, Inc., Pittsburgh, PA (US)

( * ) Notice: Subject to any disclaimer, the term of this patent is extended or adjusted under 35 U.S.C. 154(b) by 833 days.

(21) Appl. No.: 10/743,660

(22) Filed: Dec. 22, 2003

(65) Prior Publication Data

US 2005/0138544 A1    Jun. 23, 2005

(51) Int. Cl.
G06F 17/28 (2006.01)

(52) U.S. Cl. .................................. 704/3; 704/8; 704/7

(58) Field of Classification Search ................ 704/2–5, 704/7, 9, 8, 277, 276, 257; 358/1.13; 701/1
See application file for complete search history.

(56) References Cited

U.S. PATENT DOCUMENTS

| | | | |
|---|---|---|---|
| 5,931,877 A | 8/1999 | Smith et al. | |
| 6,285,924 B1 * | 9/2001 | Okamoto et al. | 701/1 |
| 6,295,134 B1 * | 9/2001 | Hughes | 358/1.13 |
| 6,772,109 B2 * | 8/2004 | Tsuchitani et al. | 704/2 |

OTHER PUBLICATIONS www.ietm.biz./quillblockdiagram.htm.

* cited by examiner

*Primary Examiner*—Huyen X. Vo
(74) *Attorney, Agent, or Firm*—The Webb Law Firm

(57) ABSTRACT

A method of interpreting electronic documents, e.g., an interactive technical manual, provides an interpreter responsive to at least one global navigational input data of a client user in order to generate a displayable output. The displayable output is generated from informational input and a contextual status. The method of interpretation includes a base semantics module and any number of extended semantics modules, a symbol table, and an output module. A plurality of global navigational data are received at the interpreter, which associates and processes the informational data received with the contextual status and outputs displayable data which is renderable by the display system into a current view. A system and computer medium are also disclosed.

21 Claims, 4 Drawing Sheets

VIEWING SYSTEM THAT SUPPORTS MULTIPLE ELECTRONIC DOCUMENT TYPES

BACKGROUND OF THE INVENTION

1. Field of the Invention

This invention relates to electronic documents and particularly to systems for viewing the same.

2. Description of Related Art

An electronic document allows the transfer of formatted text, and both electronic and print output can be obtained from the same text. Electronic documents support intelligent queries in database systems and information re-use. They facilitate set up and enforcement of document standards. Additionally, they are a tool for structured writing and make electronic presentation practical.

One specific type of electronic document is an Interactive Electronic Technical Manual (IETM). IETM as defined in the United States Department of Defense (DOD) IETM Specifications, is a package of information required for the diagnosis and maintenance of a weapons system. Such IETM's may also be applicable to other fields, such as automobiles, aircraft and machinery-intensive industries, such as the oil and gas industry. An IETM is optimally arranged and formatted for interactive screen presentation to the end-user. An IETM is a Technical Manual converted into digital format on a suitable medium, by means of an automated authoring system. An IETM is designed for electronic screen display with information designed and formatted for screen presentation thereby enhancing comprehension for the end user.

The elements of an IETM, pieces of technical data that are interrelated steps and tasks, guide an end user and make technical manual content interactive. Because of the interactive and dynamic nature of IETMs, required information can be attained through a variety of paths. Therefore, a first user may arrive at an element of data using a certain path, for example steps "a-b-c", while another user achieves exactly the same result through an entirely different path, for example steps "x-y-z". The computer-controlled technical manual display device also functions interactively, through user requests and information input, to provide procedural guidance, navigational directions, and supplemental information.

IETMs allow a user to locate required information much faster and more easily than is possible with a paper technical manual. IETMs are easier to comprehend, more specifically matched to the system configuration under diagnosis than a paper technical manual and require much less physical storage than paper. Powerful interactive troubleshooting procedures, not possible with paper technical manuals can be made available using the intelligent features of the IETM display device. The potential benefits of IETMs are widely recognized and many programs are moving to procure them in place of conventional paper technical manuals.

However, electronic documents in general and IETM in particular are currently limited in their interoperability since there are many different IETMS from many different vendors, there are many different display systems to view them. Manual types have specific elements, attributes and assignments which make them unique from other manual types. Therefore, a traditional electronic document display system is limited to working with one particular manual type. In other words, for one manual there is one technical manual display system.

SUMMARY OF THE INVENTION

The invention is a method of displaying electronic documents. The method includes providing at least one discrete pluggable interpreter responsive to at least one global navigational input data of a client user in order to generate a displayable output. The displayable output is generated from authored content, informational input and a contextual status. The method of interpretation includes a base semantics module and any number of extended semantics modules, a symbol table, and an output module. A plurality of global navigational data are received at the display system, which associates and processes the informational data received with the contextual status and outputs displayable data which is renderable by the display module into a current view. The display module is interchangeable to work with disparate display devices. The informational data optionally includes a user input field. The method will work with one or more unique electronic documents concurrently. An example of electronic document type is an Interactive Electronic Technical Manual. The semantics module contains reusable programmatic logic which extends the semantics module thereby producing programmatic logic that implements one or more structures or behaviors from the interactive manuals.

The method further includes a stored contextual status defined by one or more internal states of the interpreter for programmatic purposes. The states external to the interpreter therein includes one of displaying the manual, displaying the table of contents, displaying the index, setting bookmarks, loading bookmarks, setting sessions, loading sessions, executing a helper application, executing a diagnostic tool. The method as set forth will work with any electronic document type including one of MIL-PRF-87269, specification 1000D (S1000D), Joint Computer-Aided Acquisition and Logistic Support (JCALS).

The invention is also a system defined by a server connected to a network, at least one processor, a database of content; and a memory operatively coupled to the processor. The memory stores program instructions that when executed by the processor, cause the processor to display interpreted electronic documents.

Additionally, the invention is a computer-readable medium storing instructions thereon for causing at least one processor to perform a method that interprets electronic documents by loading at least one interpreter for the electronic document types, then receiving global navigational input data of a client user for generating a displayable output from informational input and contextual status. The computer-readable medium further defining instructions for the interpreter to include a base semantics module and any number of extended semantics modules, a symbol table, and output module.

DETAILED DESCRIPTION OF THE PREFERRED EMBODIMENT

The present invention is generally directed to an interchangeable interpreter for use in an electronic document display system. The electronic document display system as presented in the preferred embodiment is directed to a method and system for processing an Interactive Technical Manual (IETM) with an interchangeable interpreter for IETM that can plug into a display system. The interchangeable interpreter allows portability and flexibility of manual type for the technical manual display system.

Figure 1:
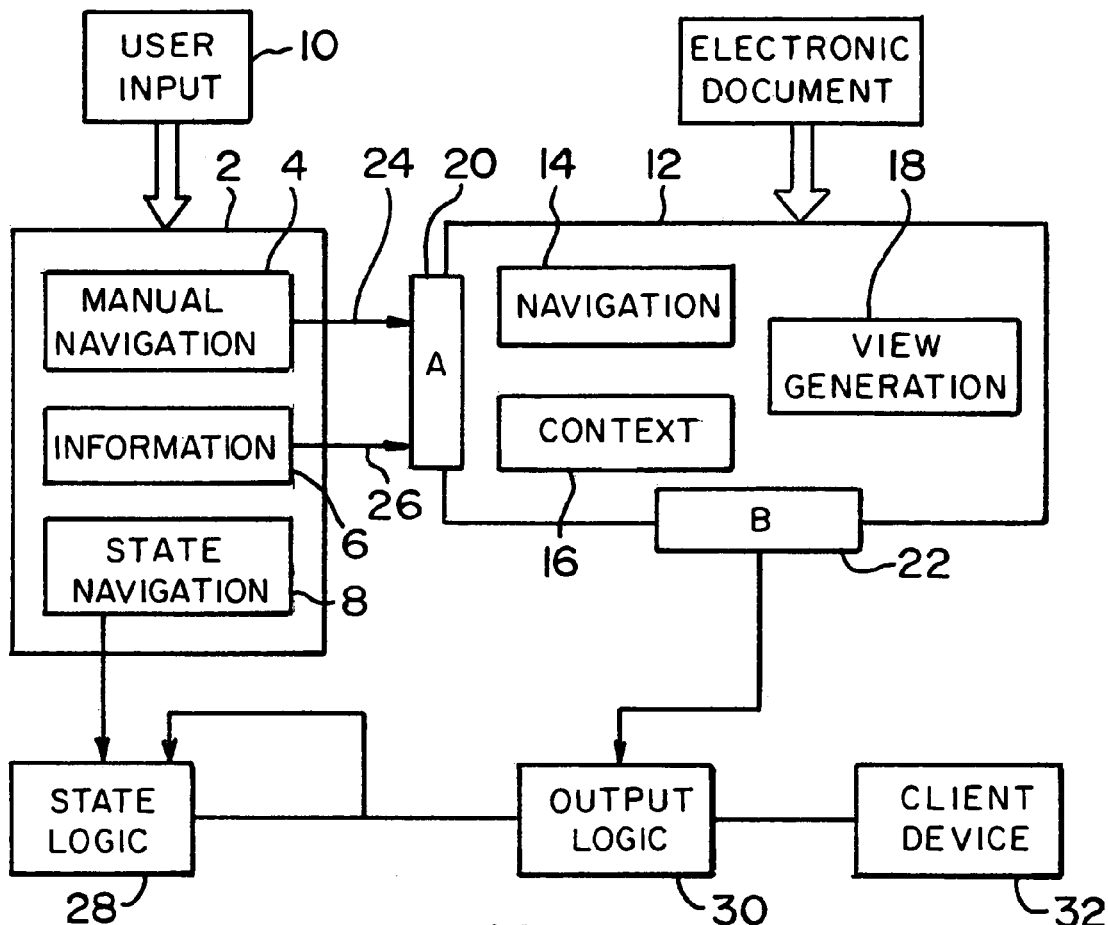
FIG. 1 is a conceptual diagram showing the method for interpreting electronic documents in the present invention.

With reference to FIG. 1, a conceptual diagram of the method for interpreting the technical manual is shown. The technical manual display system includes a controller 2. Controller 2 is the main module of the system; the point of entry for any user input 10. Included in controller 2 is a manual navigation system 4, an information system 6 and a state navigation system 8. Controller 2 accepts input from a data entry system, for example, an internet browser, and dispatches it to other elements.

Programmatically connected to controller 4 is an interpreter 12. Composed of a navigation module 14, a context module 16, and a view generation module 18, interpreter 12 utilizes each of its included modules in accepting an authored manual 11 and outputting content made renderable by the addition of generic state and output logic.

The data interface 20 of interpreter 12 provides an input for data flow. Data interface 20 allows both manual navigational input 24 and informational input 26 to pass from controller 2 to interpreter 12.

A second interface 22 facilitates the flow of data from interpreter 12 to an output logic module 30. Output logic module 30 renders the data flowing into it from interpreter 12 into display information. The module 30 combines a state logic input with data received from interpreter 12 and passes out a current view, specific to the format of a client device 32. A different display module could be used to output format compatible with another display device. Client device 32 could be any device which displays data, for example a handheld computer, laptop computer, cellular telephone or any other display capable device. The view is presented in the context of the application, with one view generator per device. The display capable device is not to be construed as limiting, as any device known in the art may be used.

Interpreter 12 is made up of three subsystems, and the interpreter utilizes an authored manual and produces display content. Interpreter 12 translates an authored behavior and applies it to a structural element of the manual. For example, an authored behavior is a pre-condition for activating a step or task, i.e. a structural element that is part of the manual. For example, suppose the structural element in the manual is a task that has a number of steps for children. The authored behavior can be programmatic logic stating: find the first step element and display it. While "next action" programmatic logic states, that if a "next" action is received, find the next step and display it. As the User Interface is rendered, a button is created with a label "next" that is bound to the "next action" programmatic logic, allowing a user to click on it to trigger the logic bound to the button. Otherwise the user can complete the step of the current programmatic logic.

Interpreter 12 also contains navigation subsystem 14. Navigation input commands flow from user input 10 through controller 2 via manual navigation system 4 to interpreter 12 and end up in navigation subsystem 14. These commands are responsible for calculating the subset of the manual that is currently active or accessed. The particular command must be specifically supported by the manual and also the interpreter. Navigation subsystem 14 receives user input in the form of navigational commands and based on state information in context subsystem 16, navigation subsystem 14 makes calculations to determine which manual elements are active.

With continuing reference to FIG. 1, context subsystem 16 is responsible for storage of context variables, which are relevant to the past, current and future states of the interpreter 12. One example of context variables is current view, tracking the currently active view for the system. For example, a current system view can be one of displaying the manual, displaying the table of contents, displaying the index, setting bookmarks, loading bookmarks, setting sessions, loading sessions, executing a helper application or executing a diagnostic tool. The view can be any view known in the art and is not to be construed as limiting. Interpreter 12 depends on context subsystem 16 for this current view variable storage and also for its determination of a currently active view. The current view context value, one of a number of manual independent variables, are combined with any variables authored into the manual, or manual dependent variables, to determine a current view and the interpreter sends that to be rendered. Other examples of contextual state include user's past actions, current location and training background of the user.

The manual navigation input commands and the context information are utilized by the view generation system 18 to determine what to display next and create a view data, which is then passed through an interface 22 to an output logic module 30 and onto a client device 32.

In general, there is one interpreter per electronic document type. Also, for this embodiment, there is one interpreter per manual type; the operation of the interpreter is tightly coupled to the manual type used in the IETM. However, the manual type used is not meant to be limiting, since any electronic document may be interpreted.

Figure 2:
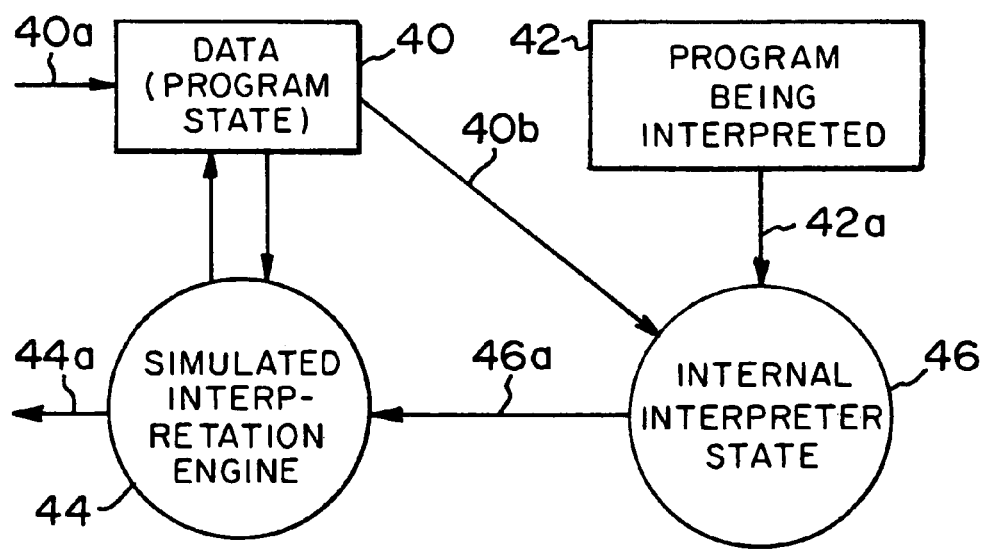
FIG. 2 is a conceptual diagram of a technical manual display system of the present invention.

With reference to FIG. 2, showing a conceptual model of a generic interpreter with four parts, the separation between content and program is demonstrated. Data program state 40 is shown having an input 40a and an output 40b. Data program state 40 corresponds to variables associated with the electronic manual being displayed. For instance, the manual might have a variable that is set whenever the user clicks on and acknowledges a warning message. Any variables that are defined in the manual and are specific to the manual being displayed fall into this category.

With continuing reference to FIG. 2, a program being interpreted 42 is shown with an output 42a. The program interpreted 42 corresponds to the electronic manual content and behavior that is currently being displayed.

A simulated interpretation engine 44 corresponds to the interpreter 12 in the technical manual display system of FIG. 1. It is the pluggable interpreter module needed to display manuals of varying manual type.

With further reference to FIG. 1 and continuing reference to FIG. 2, the final piece is that which maintains state information on the system, the internal interpreter state 46 contains variables defined by the interpreter that are independent of the electronic manual being displayed. For instance, one view generated of a particular manual may have four tabs across the top corresponding to a table of contents, content, index and search. In this case the interpreter may need to define a variable to remember what tab the user is currently viewing. This variable is specific to the manual type; however, it is not specific to the particular manual being viewed. Therefore this variable can be used by the system to determine which state is current. The state logic 28 is the module that contains these two conceptual systems.

In FIG. 2, the data program state 40 is variables that the author put into the manual when it was created and must be interpreted. Internal interpreter state 46 is variables that the interpreter designer put in, and that are needed to display any manual regardless of manual type.

FIG. 2 shows the separation between the actual content and the program which acts on that content. This highlights the separation between the present invention, which is the interpreter, and the manual that is being interpreted. Circular modules represent the interpreter.

Figure 3A:
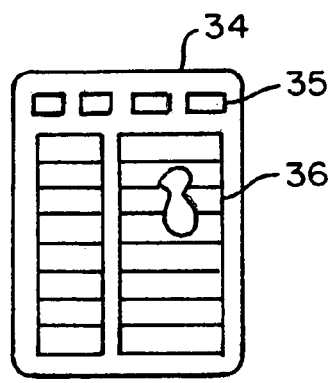
FIG. 3*a* is an illustrated view of a navigational system and manual content layout of the present invention.
Figure 3B:
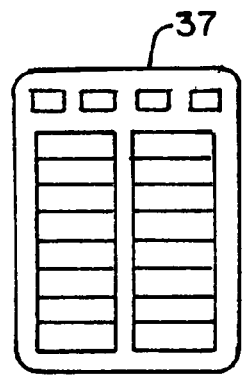
FIG. 3*b* is an illustrated view of the next page from the navigational system of FIG. 3*a*.

With reference to FIGS. 3a and 3b and continuing reference to FIG. 2, navigational data comes in, for example, through input 40a. In this example, a user clicks a "next page" button 35, linked to a next page 37 in FIG. 3b of the electronic manual display system. An action bound to the button causes the pluggable interpreter to update the manual's simulated interpreter state 44 and its internal state 46 utilizing output 40b. The pluggable interpreter then accesses the electronic manual 42 to retrieve next page 37 for display. The next page 37 is then properly formatted and constructed based on the manual's state and/or the interpreter's current state, and returned as output.

Figure 4:
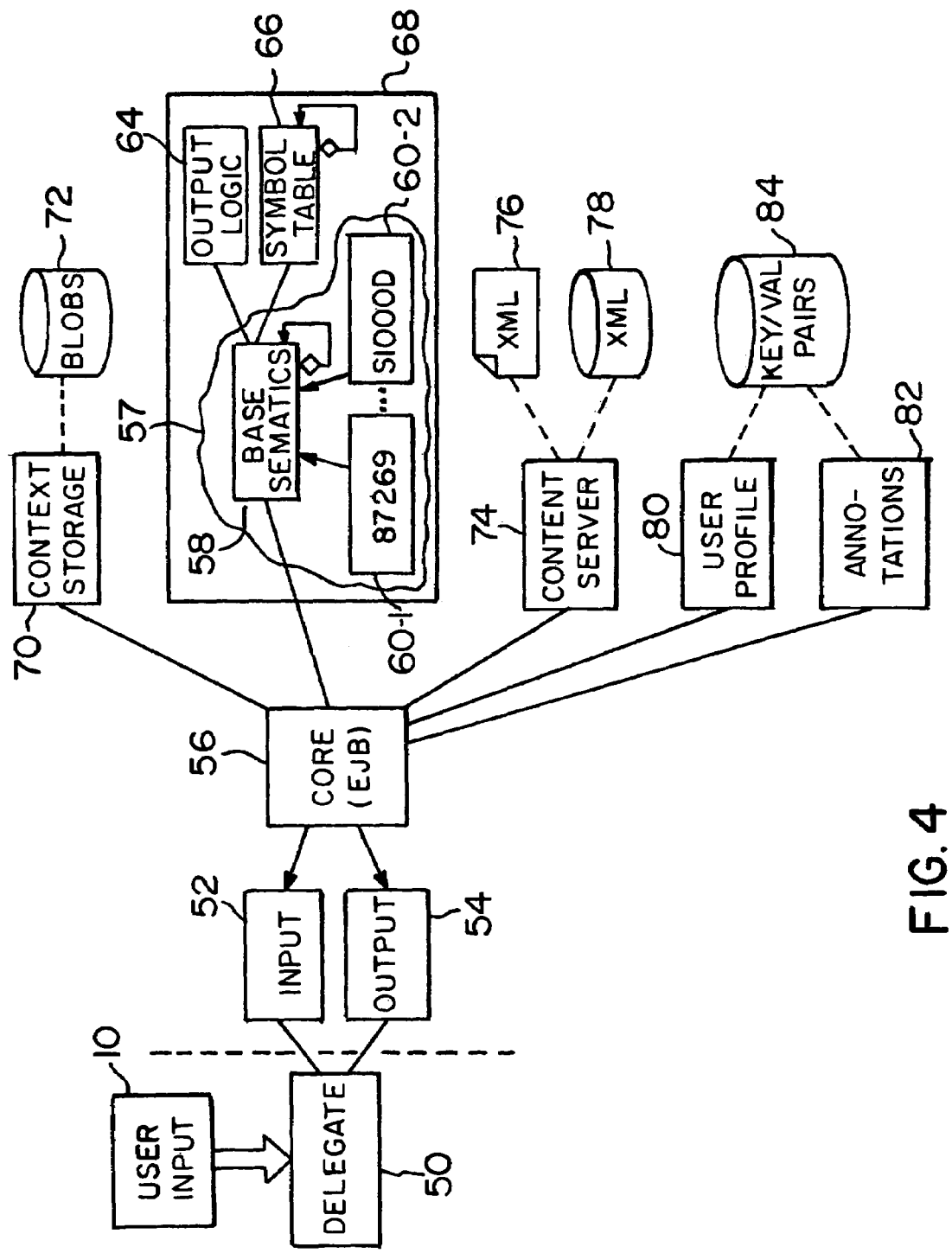
FIG. 4 is a schematic diagram illustrating the manner in which the interpreter of the present invention is implemented in a technical manual display system.

In FIG. 4, a system implementing the method of the invention has a delegate 50 which communicates with a client user 10 of any type. Delegate 50 is defined as the front end, whereby any client user 10 known in the art may reuse the delegate's programmatic logic for entry to the system. A client user 10 who utilizes delegate 50 passes input 52 to a core 56 which is a controller of all data flowing into or out of any module. Core 56 also passes data from modules to output 54.

Core 56 communicates with an interpreter system 68. Interpreter system 68 is composed of several pieces which act together to translate an authored behavior and apply this translation to a structural element of the manual. A semantics module 57, comprising base semantics 58 and extended semantics 60-1-60-2, facilitates the implementation of different interpreters. Base semantics 58 are classes designed to make an implemented interpreter reusable and extendable. Semantics module 57 is where all behaviors of IETM are applied to manual content stored in content server 74. Base semantics 58 can be extended to implement the behavior of any manual type.

In the present invention, extended semantics 60-1 is compatible with IETM authored using 87269 Standard. In another version of the same system, extended semantics 60-2 can be compatible with the S1000 D Standard. Extended semantics 60-1 and extended semantics 60-2 are subclasses of base semantics 58, whereby they extend base semantics 58 and implement other behavior that is unique to their respective types. The use of 87269 and S1000D is not to be construed as limiting, as any IETM type or other electronic document format known in the art can be implemented under the present invention.

Interpreter 68 utilizes base semantics 58 to apply behavior to content. Each manual type is implemented by extending base semantics 58 in the extended semantics 60-1, 60-2, whereby specific manual types are supported by programmatic logic which accounts for each behavioral element in the particular language. Furthermore, there is a direct one-to-one relation between each discrete interpreter and each unique document type. For example, an authored behavior exists, telling the system to find the first step element and display it, but for each manual type this behavior is programmatically different, therefore an extended semantics 60-1, 60-2 must be written for any manual type to which the interpreter must extend. Additionally, each extended semantic 60-1, 60-2 may be plugged into the display system to view multiple electronic document types simultaneously.

Figure 5:
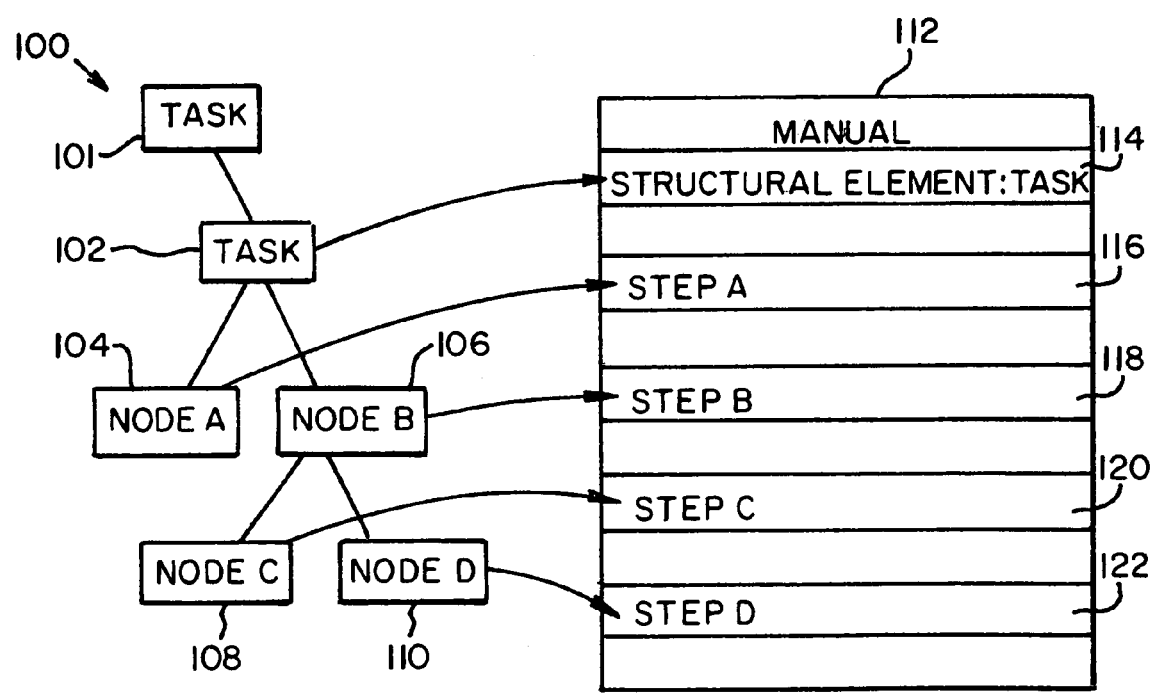
FIG. 5 is a diagrammatic illustration of a manual represented isomorphically in the present invention by a tree structure of behavioral nodes.

FIG. 5 shows behavioral nodes 100 and the related manual 112. Nodes 100 is a structural representation of the manual behavior arrived at by taking a task 114 from manual 112 and placing it in a tree node 102 of nodes 100. Following this pattern for the remaining tasks and steps of manual 112, step A 116 corresponds with node A 104, step B 118 corresponds with node B 106, step C 120 corresponds with node C 108 and step D 122 corresponds with node D 110 and any other tasks or steps authored as behavior into the manual. The resulting structure of behavioral nodes 100 is a tree-like structure known in the art and having properties as shown in FIG. 6, linking the behavioral nodes with semantic nodes 130, on a per level basis.

Figure 6:
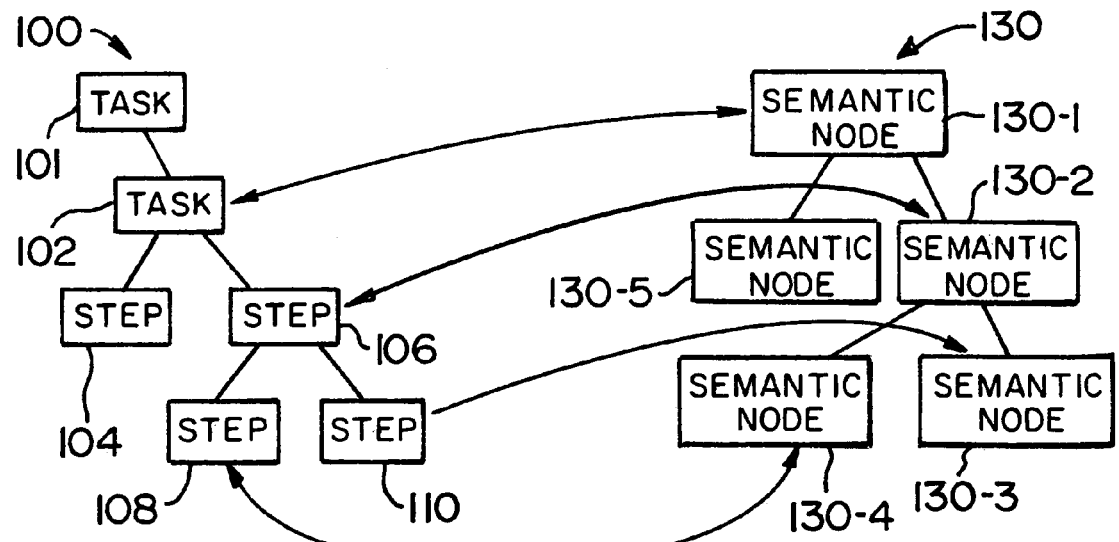
FIG. 6 is a diagrammatic illustration of the behavioral tree of FIG. 5 with associations to a semantics tree therewith.

With reference to FIG. 6 and continuing reference to FIG. 5, behavioral nodes 100 are isomorphic to semantic nodes 130. Therefore, task node 102 is related to semantic node 130-1, since they are both at the same tree level. The relationship is such that semantic nodes 130 define behavior of nodes 100, therefore each semantic node 130 is programmatic logic containing the defined behavior in a type specific language. In other words, each semantic node 130 is specific to one behavior in one manual type. Additionally, an important aspect of semantic node 100 is that they can be saved by persistence, then reactivated. After reactivation, the state of the interpreter is restored to the particular node state at the time of persistence.

Figure 7:
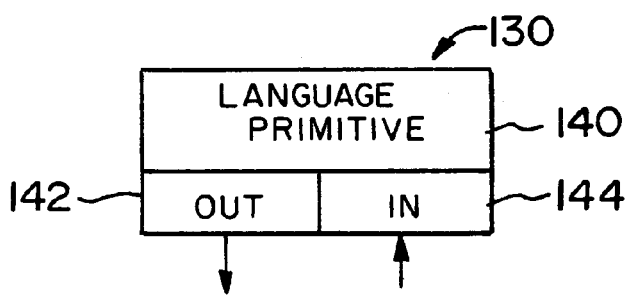
FIG. 7 is a diagrammatic illustration of a semantic node of FIG. 6 having the features of input and output therewith.

As shown in FIG. 7, a semantic node 130 in greater detail is broken into its component pieces. It is composed of a language primitive 140 and an interface output 142 along with input 144. Input 144 changes state of semantics nodes 130. Output 142 allows data to flow from interpreter to client. A value returned to the client depends on a combination of content in the semantics tree and information in a symbol table. The value returned is a User Interface Markup Language (UIML) instance for what is to be displayed.

With reference to FIG. 4, a symbol table 66 is an internal portion of interpreter 68 that stores manual dependent variables, which maintain the state of the IETM being interpreted. These manual dependent variables stored in symbol table 66 are nested, with each node representing a single scope. An example of a manual dependent variable is a variable that can track when a warning message was clicked. However, a manual dependent variable can be any input by a user in any form, typically a variable entered into a radio button or text box in response to a request from the interpreter. Variable names are not reused in a particular scope. Therefore, variables can be defined, removed, and assigned values only in a local scope. New scopes can only be nested within the scope of the creating node.

Figure 8:
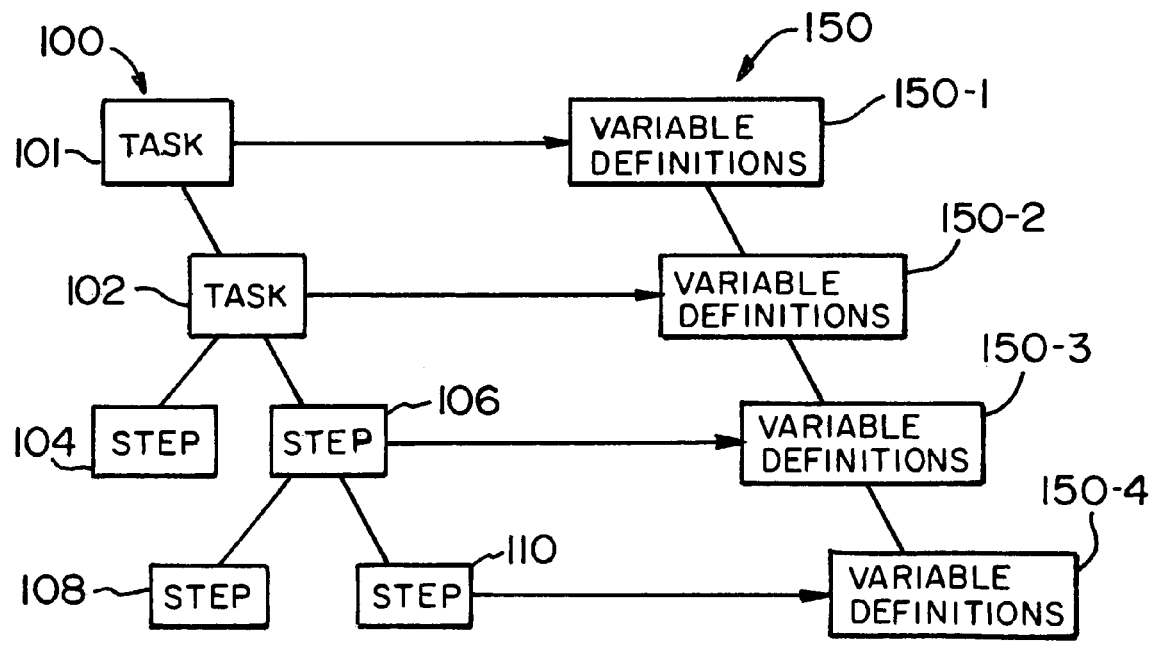
FIG. 8 is a diagrammatic illustration of the behavioral tree of FIG. 5 with associations to variable definitions therewith.

With reference to FIGS. 5 and 8, a symbol table is shown with variable definitions 150, corresponding to behavior nodes 100 of the manual 112. The scope of variable definition nodes 150 is determined by behavior nodes 100. The variable definitions are utilized by the interpreter during runtime as needed. However, a set of variables may be nested when not in use as the programmatic logic of the behavioral nodes 100 is mirrored. During runtime, a task 102 of behavioral nodes 100 may be run. Task 102 may make a call to step 106, in doing so the interpreter will store all the variables that were utilized as task 102 was running and create a new set of variable definitions for the interpreter to use at step 106. Further, nested step 110 can be called by step 106, whereby this process repeats itself. Variable definitions 150-4 are created; variable definition node 150-3 is pushed on the stack for storage. After the user completes step 106, the interpreter is finished with variable definitions 150-1-150-4 and looks back at variable definition 150 for the last active set, which is on the top of the stack, variable definition nodes 150-3.

In FIG. 8, the scope of variable definitions 150-1-150-4 are nested hierarchically in relation to behavior nodes 100. From the root node 101, a tree includes every child node and uses variable definitions 150-1. As the system descends to the next level of the tree, task node 102 of behavior nodes 100, and likewise, scope descends to variable definitions 150-1. This pattern of subtree formation continues as the behavioral nodes 100 are descended. Variable definitions 150-1-150-4 are unique for each related subtree, each variable definition 150 only includes itself within its scope. However, a sibling subtree would not be in the same scope. In other words, two trees that are not connected are not in the same scope.

With continuing reference to FIG. 4, core 56 passes variables to context module 70 to be saved, with persistence done in a database such as context database 78. In the preferred embodiment an SQL binary large object (hereinafter referred to as "BLOB") is used to store the data, however usage with any database known in the art is envisioned and this is not meant to be limiting. The context module 70 stores the variables that are not in the IETM. A collection of previous states is stored. Before the interpreter state is updated, the current state is saved into history. Each entry in the history is unique and tagged with the type of navigation that is about to take place. Entries in history are arranged in a stack, with new entries pushed onto the top of the stack.

The state of interpreter is contained in two places, the runtime state of the semantics tree 130 and the information in the symbol table 66. The state of the interpreter is captured by serializing the semantics tree. The semantics tree has handles to symbol table 66, so the entire interpreter state is captured by a single serialized BLOB. The handles to the content are transient. Therefore, the state of the interpreter can be restored by simply deserializing a BLOB. The transient handles to the content are restored on demand.

When navigation takes place, an entry is pulled from the top of the stack and read. When core 56 needs to roll back the interpreter 68, it pops the previous state off the history stack. For example, when a client requests backward navigation, core 56 pops a single previous state off the history stack. Then the state that it previously captured is entered. For example, the previous state can be one of displaying the manual, displaying the table of contents, displaying the index, setting bookmarks, loading bookmarks, setting sessions, loading sessions, executing a helper application or executing a diagnostic tool.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method for displaying a plurality of interactive electronic technical manual types from a display system, comprising the steps of:
   a. linking the display system with a discrete pluggable interpreter responsive to interactive electronic technical manual type;
   b. receiving at the interpreter at least one electronic document of an interactive electronic technical manual, said electronic document passing a variable to be interpreted;
   c. interpreting the received electronic document, said interpreter providing at least one semantic node for said electronic document type and at least one symbol table for defining a program state and interpreter state that are combined to form display data; and
   d. outputting display data that is renderable by the display device.

2. The method as set forth in claim 1, further comprising, after step d) the steps of:
   unlinking the discrete pluggable interpreter from the display system;
   linking a different discrete pluggable interpreter, wherein said discrete pluggable interpreter is responsive to a second interactive electronic technical manual type;
   receiving at the display system at least one electronic document;
   processing inside the linked discrete pluggable interpreter the received electronic documents; and
   outputting data which is renderable by the display system into a current view.

3. The method as set forth in claim 1, wherein the discrete pluggable interpreter is responsive to at least one global navigational input data of a client user for the Interactive Electronic Technical Manual, wherein generated displayable output is produced from informational input, authored content and a contextual status.

4. The method as set forth in claim 3, further comprising, the steps of:
   receiving at the interpreter the at least one global navigational data;
   associating the informational data received with the contextual status, whereby the informational data includes at least one user input field; and
   processing the at least one global navigational data.

5. The method as set forth in claim 3, wherein the stored contextual status is defined by:
   one or more states internal to the interpreter for programmatic purposes; and
   one or more states external to the interpreter.

6. The method as set forth in claim 5, wherein the stored contextual status determines display data output based on a user's actions, current location and training background.

7. The method as set forth in claim 5, wherein the set of external states is one of displaying the manual, displaying the table of contents, displaying the index, setting bookmarks, loading bookmarks, setting sessions, loading sessions, executing a helper application, and executing a diagnostic tool.

8. The method as set forth in claim 5, wherein the set of states is captured in serializable objects, persisted to a database, and then restarted as needed to place the interpreter into the prior captured state.

9. The method as set forth in claim 3, wherein the informational data includes at least one of serial number of a part and symptoms of a problem.

10. The method as set forth in claim 1, wherein said semantics node comprises a base semantics module and any number of extended semantics modules.

11. The method as set forth in claim 1, wherein the semantics node implements one or more structures or behaviors from the interactive technical manual as a step or a task that are each associated with content in a semantics module.

12. The method as set forth in claim 11, wherein the behaviors are one or more preconditions that are each operatively associated with structures in a semantics module.

13. The method as set forth in claim 1, further comprising, prior to the receiving step, the step of linking with the display system multiple discrete pluggable interpreters wherein said multiple discrete pluggable interpreters are each responsive to a unique electronic document type.

14. The method as set forth in claim 13, wherein the display system is capable of displaying multiple electronic document types concurrently.

15. The method as set forth in claim 1, wherein the single display system is capable of linking to a plurality of discrete display modules.

16. The method as set forth in claim 15, further comprising the steps of:
   unlinking the discrete display module from the display system;
   linking a different discrete display module, wherein said discrete display module dynamically generates information for a particular display device; and
   outputting data from the display system to the particular display device.

17. The method as set forth in claim 16, wherein the particular display device is one of a computer desktop, a computer tablet, a handheld computer or a cellular telephone.

18. The method as set forth in claim 15, wherein the wherein said discrete display module is capable of providing customized application presentation.

19. The method as set forth in claim 1, wherein manual type is one of MIL-PRF-87269, specification 1000D (S1000D), Joint Computer-Aided Acquisition and Logistic Surface (JCALS).

20. A computer implemented method comprising:
   a. providing a display system capable of linking to a discrete pluggable interpreter;
   b. linking the display system with a discrete pluggable interpreter responsive to an interactive electronic technical manual type;
   c. receiving at the interpreter at least one electronic document of an interactive electronic technical manual, said electronic document passing a variable to be interpreted;
   d. interpreting the received electronic document, said interpreter providing at least one semantic node for said electronic document type and at least one symbol table for defining a program state and interpreter state that are combined to form display data; and
   e. outputting display data that is renderable by the display device.

21. The computer implemented method of claim 20, wherein the display data is generated by an interchangeable display module, whereby said display module may be exchanged so as to create display data for a plurality of display devices.

* * * * *